United States Patent [19]

Lippincott

[11] Patent Number: 5,748,234
[45] Date of Patent: May 5, 1998

[54] VIDEO PROCESSING SYSTEM AND METHOD

[75] Inventor: Louis A. Lippincott, Roebling, N.J.

[73] Assignee: Intel Corporation, Santa Clara, Calif.

[21] Appl. No.: 305,201

[22] Filed: Sep. 13, 1994

[51] Int. Cl.$^6$ ............................................. H04N 5/30
[52] U.S. Cl. ........................ 348/222; 348/231; 348/17; 348/22
[58] Field of Search ......................... 348/222, 15, 17, 348/19, 22, 23, 207, 552, 719, 231, 232, 153, 154, 230; H04N 7/30

[56] References Cited

U.S. PATENT DOCUMENTS

| | | | |
|---|---|---|---|
| 4,158,208 | 6/1979 | Dischert | 348/207 |
| 4,831,438 | 5/1989 | Bellman, Jr. et al. | 348/153 |
| 5,016,107 | 5/1991 | Sasson et al. | 348/231 |
| 5,027,104 | 6/1991 | Reid | 348/153 |
| 5,077,612 | 12/1991 | Megrgardt et al. | 348/231 |
| 5,206,730 | 4/1993 | Sakai | 348/231 |
| 5,303,049 | 4/1994 | Ejima et al. | 348/231 |
| 5,319,453 | 6/1994 | Copriviza et al. | 348/6 |
| 5,412,708 | 5/1995 | Katz | 348/14 |
| 5,414,464 | 5/1995 | Sakai | 348/231 |

*Primary Examiner*—Glenton B. Burgess
*Attorney, Agent, or Firm*—William H. Murray; N. Stephan Kinsella

[57] ABSTRACT

A method and video processing system for receiving and processing consecutive sets of video signals from a video camera. A first capture signal is transmitted to the video camera. A first set of one or more video frames is received from the video camera in response to the first capture signal. The first set of one or more video frames is processed by the video processing system.

18 Claims, 3 Drawing Sheets

# 5,748,234

VIDEO PROCESSING SYSTEM AND METHOD

BACKGROUND OF THE INVENTION

1. Field of the Invention

The present invention relates to video processing systems.

2. Description of the Related Art

For applications such as video conferencing, video cameras generate image signals for further processing (e.g., compression) by video processing systems. A conventional video camera transmits successive frames of video data ("video frames") at a constant frame rate to a video processing system. In this manner, each video frame is "pushed" from the camera, i.e. the video frames are transmitted from the camera at a fixed frame rate. However, the video processing system may not be able to process the video data at the rate at which the video frames are generated by the video camera.

To deal with this problem, some conventional video processors simply ignore (i.e., drop) frames that cannot be processed. Dropping frames causes image quality artifacts in the temporal domain (such as image movement granularity and temporal distortion) and is therefore problematic.

Temporal distortion may place an additional processing burden on the video processor, because many standard compression and decompression techniques work more efficiently when successive images do not vary very much. In addition, multiple frames may need to be buffered in memory during processing. This may add cost to the system as well as contribute to video image latency problems in real-time video conferencing applications.

Even if the frame generation rate of the video camera matches the processing rate of the video processor, the processing rate is only an average since the video processing system may dynamically alter its processing time based on the content of the image and the amount of motion from one frame to another. For example, when there is very little motion from one frame to the next, the system may compress frames relatively quickly. When the video processor compresses at a rate greater than that of the video camera, available processor processing time may be wasted, since more images could be processed.

When there is more interframe movement, the system may compress frames at a lower rate in order to retain image detail. When the video processor rate falls below average, and thus below the rate of frames being produced by the camera, the processor will either need to buffer in memory the surplus frames or drop frames. This may require extra hardware and complexity, and can give rise to the problems discussed above.

For the foregoing reasons, there is a need for video processing systems and video cameras that avoid the inefficiencies and video degradation that result when the processing rates of video cameras and video processors do not match.

Further objects and advantages of this invention will become apparent from the detailed description of a preferred embodiment which follows.

SUMMARY

The previously mentioned needs are fulfilled with the present invention. There is provided herein a method and video processing system for receiving and processing consecutive sets of video signals from a video camera, comprising means for transmitting a first capture signal to the video camera, means for receiving a first set of one or more video frames from the video camera in response to the first capture signal, and means for processing the first set of one or more video frames.

BRIEF DESCRIPTION OF THE DRAWING

These and other features, aspects, and advantages of the present invention will become more fully apparent from the following description, appended claims, and accompanying drawing in which:

DESCRIPTION OF THE PREFERRED EMBODIMENT

Figure 1:
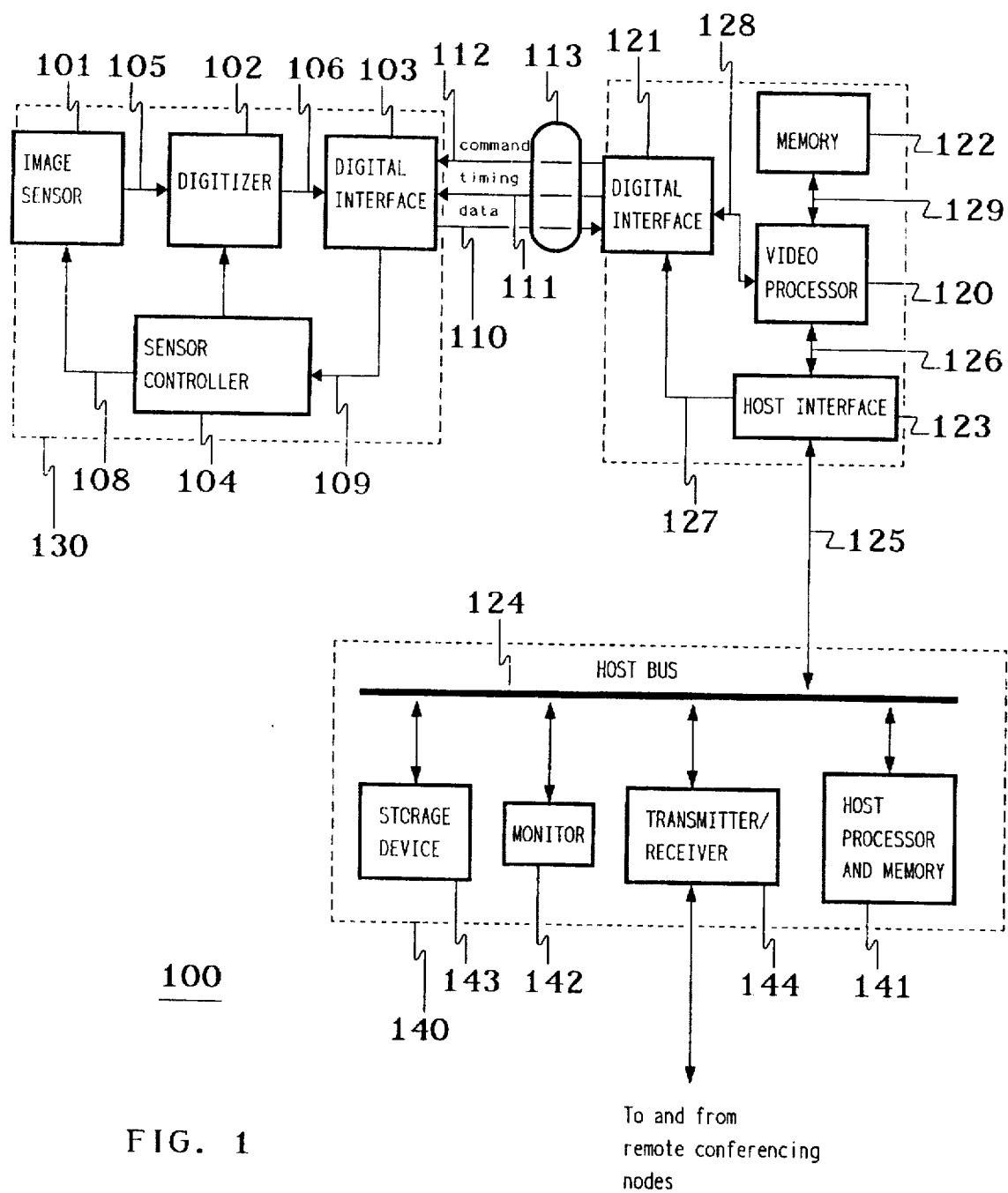
FIG. 1 depicts a block diagram of a preferred video system in accordance with the present invention.

Referring to FIG. 1, there is shown a personal computer-based video system 100 comprising a video processing subsystem 131, video camera 130, and a computer system 140. Video camera 130 generates a series of video frames for further processing by video processing system 131 and computer system 140.

Video processing subsystem 131 comprises video processor 120, memory 122, host interface 123, and digital interface 121. Video camera 130 comprises image sensor 101, digitizer 102, sensor controller 104, and digital interface 103. Digital interfaces 103 and 121 are interconnected by cable interconnect 113, which comprises data line 110, timing line 111, and command line 112. Video processing subsystem 131 is connected to computer system 140 via host bus 124. Computer system 140 comprises host bus 124, host processor and memory 141, monitor 142, a transmitter/receiver 144, and storage device 143.

Image sensor 101 of video camera 130 may be any sensor suitable for generating analog image signals, and is preferably a CCD sensor such as a 640×480 pixel array. Sensor controller 104 may be any controller suitable for controlling the capture of video images by image sensor 101. Digitizer 102 may be any digitizer suitable for converting analog video signals into digital video frames, and is preferably an 8-bit analog-to-digital converter. Digital interface 103 may be any digital interface between components such as digitizer 102 and sensor controller 104 of video camera 130 and digital interface 121 of video processing subsystem 131, and is preferably a high-speed parallel interface.

Digital interface 121 may be any digital interface suitable for establishing an interface between components such as host interface 123 and video processor 120 of video processing subsystem 131 and digital interface 103 of video camera 130, and is preferably part of Host Interface ASIC. Video processor 120 may be any suitable processor capable of compressing video images, and is preferably an Intel® Video Processor such as 82750PB. Memory 122 of video processing subsystem 131 may be any device suitable for storing digital image signals, and is preferably two 256k×16 DRAMs. Host interface 123 may be any device suitable for providing a digital interface between video processor 120 and host bus 124, and is preferably an ASIC, integrating the host interface and digital interface 121.

Host processor and memory 141 of computer system 140 may be any processor suitable for compression and decompression or other processing of video frames, and is preferably an Intel® general-purpose processor such as Intel® i486™ or Pentium™ processor. Transmitter/receiver 144 may be any device suitable for transmitting and receiving compressed video signals between remotely-located PC-based conferencing nodes, and is preferably a general-purpose modem. Monitor 142 may be any monitor suitable for displaying video images, and is preferably a monitor with VGA or higher resolution. Storage device 143 may be any suitable mass storage device for storing compressed video signals, and is preferably a hard disk.

Typically, conventional video cameras employ one-way communication, such that video frames are transmitted or "pushed" from the video camera to a video processor at a constant rate determined by the video camera, as described in the Background of the Invention, above. In the current invention, video frames are not captured by video camera 130 and transmitted to video processing subsystem 131 until video processing subsystem 131 transmits a capture signal to video camera 130 to request a video frame. In this manner video frames are "pulled" from video camera 130 by video processing subsystem 131. Since the time required to process video frames may vary from frame to frame and may depend on frame content (e.g., amount of movement) and frame type (e.g., interframe vs. intraframe), video frames are not always captured at a constant rate as in conventional video cameras described above.

Figure 2:
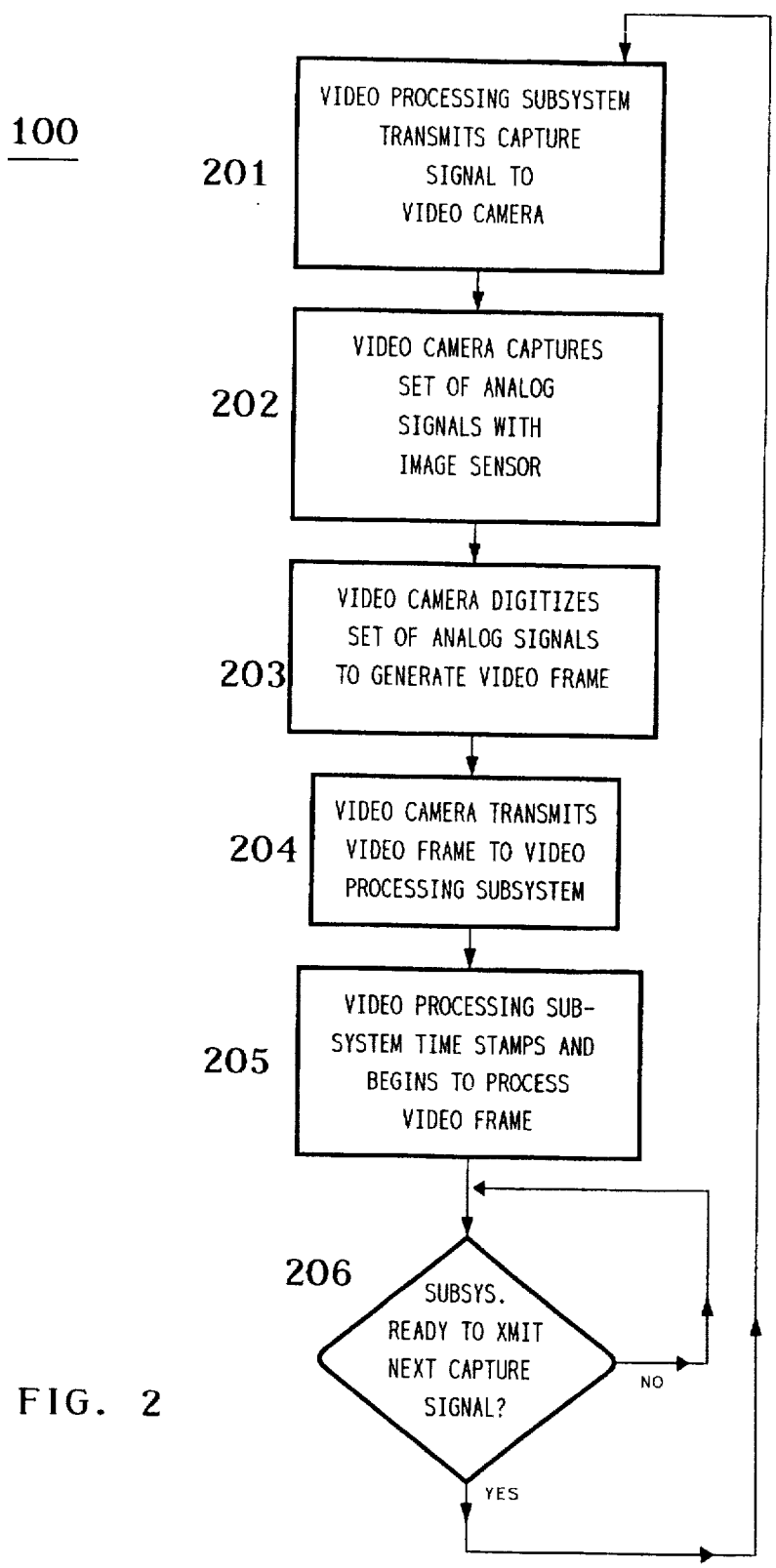
FIG. 2 is a flow chart of the method of operation of the video system of FIG. 1.

Referring now to FIG. 2, there is shown a flow diagram of the processing of video system 100 of FIG. 1, according to a preferred embodiment of the present invention. When video processing subsystem 131 is ready to receive a video frame for processing, it sends a capture signal to the video camera 130 via command line 112 to indicate that the video camera should capture a video frame (step 201 of FIG. 2).

When video processing subsystem 131 sends a capture signal to video camera 130, the capture signal is received by digital interface 103 and processed by sensor controller 104. Sensor controller 104 then instructs image sensor 101 to capture the current image viewed by image sensor 101 (step 202). The current image is captured as a set of analog video signals by image sensor 101 and is transmitted directly to digitizer 102 via line 105. Digitizer 102 digitizes the analog video signals (step 203). The captured video frame is transmitted, via data line 110, using digital interfaces 103 and 121, to video processor 120 of video processing subsystem 131 (step 204) for compression or other processing (step 205). Timing information is sent from video processing subsystem 131 via timing line 111 to control the timing of the transmission of video frames to video processor 120. Video processor 120 time stamps the received digital video frame to indicate the absolute or relative time at which the video frame was captured (step 205).

Some time after video processor 120 begins to process the current video frame, video processing subsystem 131 will be ready to send another capture signal to video camera 130 to request another video frame (step 206). Unlike conventional video cameras that "push" video frames from the video camera to a video processor at a constant rate determined by the video camera, as described in the Background of the Invention, above, video camera 130 does not capture another video frame until video processing subsystem 131 sends another capture signal to video camera 130.

Video processing subsystem 131 may wait until the current video frame is completely processed before requesting another video frame. Alternatively, in order to maximize efficient processor usage, video processing subsystem 131 may transmit a capture signal to video camera 130 before the current video frame is completely processed, so that by the time the next video frame is transmitted, video processor 120 will have just finished processing the current video frame. In this manner, the dead time of video processor 120 between processing successively captured video frames may be reduced. With either method of determining the timing of successive capture signals, it will be understood by those skilled in the art that the timing of the transmission of each capture signal is a function of the processing of the current video frame. Since the time for processing different video frames may vary, the duration of time between consecutive capture signals may also vary.

In this manner, video frames are "pulled" from video camera 130 under control of video processing subsystem 131 instead of being "pushed" as from a conventional video camera. Thus video camera 130 does not determine the frame rate of video frames transmitted to video processing subsystem 131. Rather, video camera 130 waits for a capture signal from video processing subsystem 131 before another video frame is captured and transmitted. By using this "frame on demand" capability, video system 100 can dynamically adjust the amount of processing time used on individual video frames without having to drop frames. As a result, the overall perceived motion and image quality of the system are improved.

In order to reduce temporal distortion observable in the processed video frames due to the variable times between captured frames, each frame is preferably time stamped by video camera 130 as it is captured. When each video frame is time stamped, information is appended onto the frame indicating the relative or absolute time of the video frame. This time-stamp data may be used upon redisplay or further processing of the video frames to reconstruct more accurately and with less distortion the original temporal motion of the moving video image.

In a preferred embodiment in which video system 100 functions as a video conferencing system, video processing subsystem 131 of video system 100 compresses the captured video frames. In this embodiment, when the current video frame is transmitted to video processor 120, video processor 120 stores the captured video frame data as uncompressed bitmaps in memory 122. Video processor 120 then reads the captured video frame data from memory 122 for compression, and stores the resulting compressed video bitstream back to memory 122. This compressed bitstream may be recalled from memory 122 for transmission via line 126, host interface 123, line 125, and host bus 124 to computer system 140.

Computer system 140 may be used to establish a video conference with one or more remote conferencing nodes (not shown). As computer system 140 receives compressed video frames from video processing subsystem 131, transmitter/receiver 144 may be directed by host processor 141 to transmit the compressed video frames to the remote conferencing nodes, and to receive compressed video frames from the remote conferencing nodes.

Monitor 142 of computer system 140 may be used to display various types of video images. Monitor 142 may be used to display decompressed video frames generated from the compressed bitstreams received from the remote conferencing nodes. These decompressed video frames are preferably decompressed by host processor 141. Monitor 142 may also display the unprocessed video frames captured by video camera 130. Alternatively, monitor 142 can display the "companded" video frames (i.e., the result of decompressing the compressed bitstream generated by video processing subsystem 131). In this usage, monitor 140 displays the same image seen by the users of the remote conferencing nodes. Monitor 142 may also display a combination of these video images simultaneously in different windows.

Storage device 143 may be used to store the compressed video frames generated by video processing subsystem 131 and/or the compressed video frames received by computer system 140 from the remote conferencing nodes in order to record a video conferencing session.

It will be appreciated by those skilled in the art that some or all of the above-described functions of video processor 120 may be performed by host processor 141. Thus, referring now to FIG. 3, there is shown a video system 300 comprising computer system 140 and video camera 130, in which computer system 140 performs the functions performed by video processing subsystem 131 of video system 100 shown in FIG. 1. In this embodiment, host processor 141 generates the capture signals to instruct video camera 130 to capture video frames. Host processor 141 may also compress or otherwise process video frames captured by video camera 130.

Figure 3:
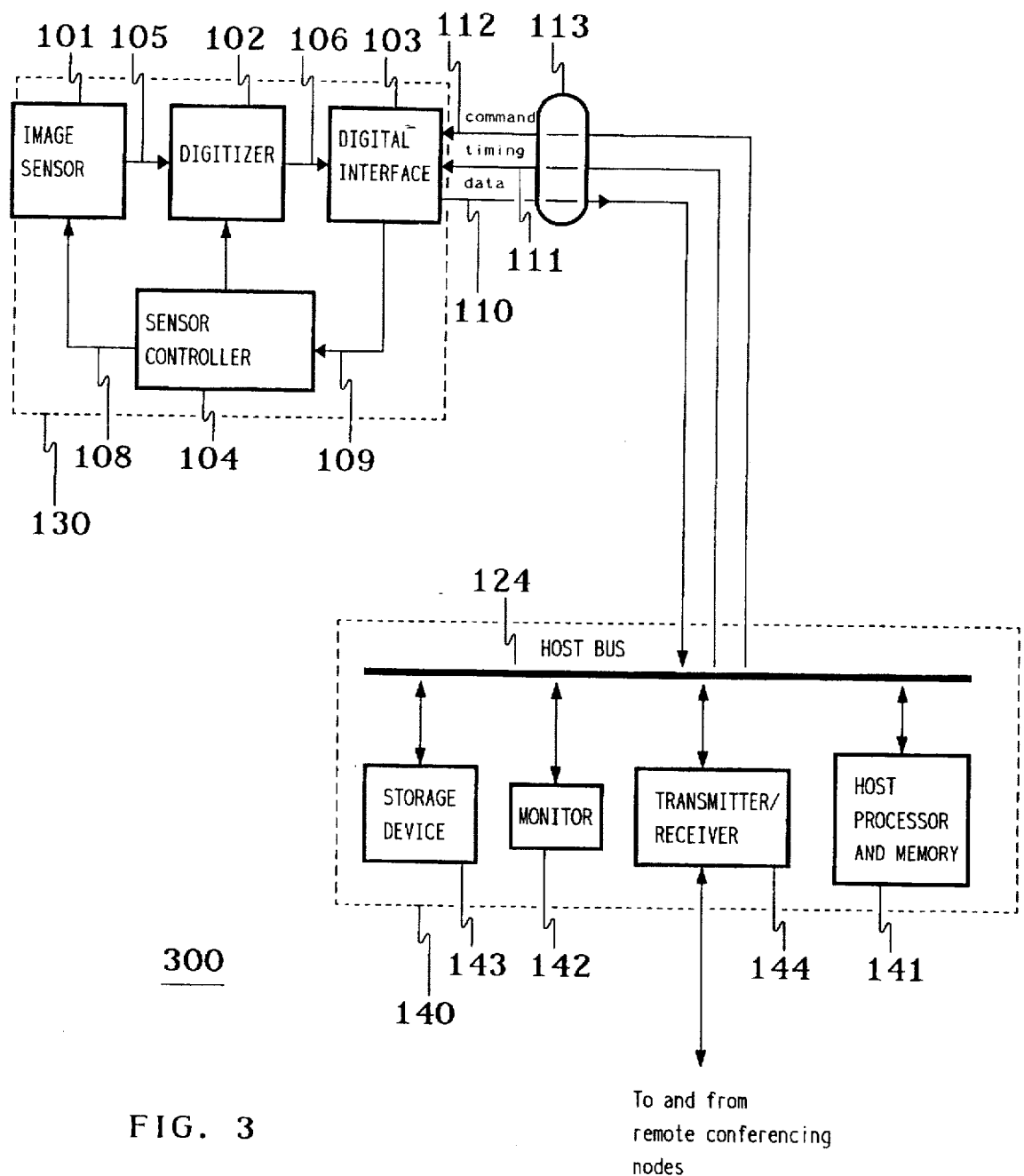
FIG. 3. depicts a block diagram of a video system in accordance with an alternative preferred embodiment of the present invention.

In the preferred embodiments of FIGS. 1-3, the video camera generates one video frame for every capture signal received. In alternative embodiments of the present invention, a capture signal specifies a particular frame capture rate for the video camera. After receiving such a capture signal, the video camera continues to generate video frames at the specified rate, until another capture signal is received. Alternatively, the capture signal may also specify the duration for which the video camera is to generate video frames at the specified rate. In these embodiments, the video processing subsystem or computer system selects the desired frame capture rate based on the current processing status.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for processing video signals, comprising the steps of:
   (a) transmitting a first capture signal from a video processing system to a video camera;
   (b) receiving a first video frame from the video camera by the video processing system in response to the first capture signal;
   (c) processing the first video frame with the video processing system; and
   (d) transmitting a second capture signal to the video camera at a time during the processing of the first video frame to request a second video frame.

2. The method of claim 1, wherein:
   steps (a)–(d) are repeated for a plurality of consecutive capture signals; and
   the durations of time between different consecutive pairs of the consecutive capture signals vary.

3. The method of claim 1, wherein step (a) comprises the steps of:
   capturing a first set of analog video signals corresponding to the first video frame in response to the capture signal; and
   digitizing the first set of analog video signals to generate the first video frame.

4. The method of claim 1, wherein step (c) further comprises the step of time stamping the first video frame.

5. The method of claim 1,
   wherein step (a) further comprises the steps of:
   (1) capturing a first set of analog video signals corresponding to the first video frame in response to the capture signal;
   (2) digitizing the first set of analog video signals to generate the first video frame; and
   (3) transmitting the first video frame from the video camera to the video processing system;
   wherein:
      step (c) further comprises the step of time stamping the first video frame;
      steps (a)–(d) are repeated for a plurality of consecutive capture signals; and
      the durations of time between different consecutive pairs of the consecutive capture signals vary.

6. A method for processing video signals, comprising the steps of:
   (a) transmitting a first capture signal from a video processing system to a video camera, wherein the first capture signal specifies a first frame capture rate for the video camera;
   (b) capturing with the video camera a first plurality of video frames at the first frame capture rate in response to the first capture signal;
   (c) receiving the first plurality of video frames from the video camera by the video processing system;
   (d) processing the first plurality of video frames with the video processing system; and
   (e) transmitting a second capture signal to the video camera to request a second plurality of video frames, wherein the second capture signal specifies a second frame capture rate based on the status of the processing of the first plurality of video frames.

7. The method of claim 6, wherein:
   steps (a)–(e) are repeated for a plurality of consecutive capture signals; and
   each of the plurality of consecutive capture signals specifies a respective frame capture rate for the video camera.

8. The method of claim 7, wherein the frame capture rates specified by a consecutive pair of the plurality of consecutive capture signals are not the same.

9. A video processing system for receiving and processing consecutive sets of video signals from a video camera, comprising:
   (a) means for transmitting a first capture signal to the video camera;
   (b) means for receiving a first video frame from the video camera in response to the first capture signal;
   (c) means for processing the first video frame; and
   (d) means for transmitting a second capture signal to the video camera at a time during the processing of the first video frame to request a second video frame.

10. The video processing system of claim 9, further comprising:
    (e) means for repeating the functions of means (a)–(d) for a plurality of consecutive capture signals, wherein the durations of time between different consecutive pairs of the consecutive capture signals vary.

11. The video processing system of claim 9, wherein the video camera comprises:
    (v1) means for capturing a first set of analog video signals corresponding to the first video frame in response to the capture signal;

(v2) means for digitizing the first set of analog video signals to generate the first video frame; and (v3) means for transmitting the first video frame to the video processing system.

12. The video processing system of claim 9, further comprising:

(d) means for time stamping the first video frame.

13. The video processing system of claim 9, further comprising:

(e) means for time stamping the first video frame; and (f) means for repeating the functions of means (a)–(e) for a plurality of consecutive capture signals, wherein the durations of time between different consecutive pairs of the consecutive capture signals vary;

wherein the video camera comprises:

(v1) means for capturing a first set of analog video signals corresponding to the first video frame in response to the capture signal;

(v2) means for digitizing the first set of analog video signals to generate the first video frame; and (v3) means for transmitting the first video frame to the video processing system.

14. The video processing system of claim 9, wherein:

the video processing system is electrically connected to a memory; and the video processing system is electrically connected to a bus.

15. A video processing system for receiving and processing consecutive sets of video signals from a video camera, comprising:

(a) means for transmitting a first capture signal to the video camera, wherein the first capture signal specifies a first frame capture rate for the video camera and the video camera comprises means for capturing a first plurality of video frames at the first frame capture rate in response to the first capture signal;

(b) means for receiving the first plurality of video frames from the video camera;

(c) means for processing the first plurality of video frames; and (d) means for transmitting a second capture signal to the video camera to request a second plurality of video frames, wherein the second capture signal specifies a second frame capture rate based on the status of the processing of the first plurality of video frames.

16. The video processing system of claim 15, further comprising:

(e) means for repeating the functions of means (a)–(d) for a plurality of consecutive capture signals, wherein each of the plurality of consecutive capture signals specifies a respective frame capture rate for the video camera.

17. The video processing system of claim 16, wherein the frame capture rates specified by a consecutive pair of the plurality of consecutive capture signals are not the same.

18. The video processing system of claim 17, wherein:

the video processing system is electrically connected to a memory; and the video processing system is electrically connected to a bus.

* * * * *